(12) United States Patent
Lutnaes

(10) Patent No.: US 6,285,421 B1
(45) Date of Patent: Sep. 4, 2001

(54) LIQUID CRYSTAL DISPLAY TEMPERATURE MEASURING IN ADHESION MATERIAL

(75) Inventor: Sturla Lutnaes, Uppsala (SE)

(73) Assignee: Telefonaktiebolaget LM Ericsson, Stockholm (DE)

(*) Notice: Subject to any disclaimer, the term of this patent is extended or adjusted under 35 U.S.C. 154(b) by 0 days.

(21) Appl. No.: 09/346,282

(22) Filed: Jul. 1, 1999

(30) Foreign Application Priority Data

Jul. 6, 1998 (SE) .................................................. 9802460
Aug. 27, 1998 (SE) ................................................ 9802876

(51) Int. Cl.⁷ .................................................. G02F 1/133
(52) U.S. Cl. ............................. 349/72; 349/153; 345/101
(58) Field of Search ............................. 349/72, 161, 162, 349/153, 199; 374/163, 183; 345/101

(56) References Cited

U.S. PATENT DOCUMENTS

| 5,029,982 | 7/1991 | Nash | 350/331 |
|---|---|---|---|
| 5,406,400 | 4/1995 | Matsuda | 359/86 |

FOREIGN PATENT DOCUMENTS

| 0845696 A2 | 6/1998 | (EP) . |
|---|---|---|
| 59-197020 A | 11/1984 | (JP) . |
| 54-64998 A | 5/1997 | (JP) . |
| 9-258161 A | 10/1997 | (JP) . |
| WO 9811468 A1 | 3/1998 | (WO) . |
| WO 982977A1 | 7/1998 | (WO) . |

OTHER PUBLICATIONS

Balzer, W., et al; "Combination of Heating and Temperature Measurement in a Compact Liquid–Crystal Cell," J. Phys. E. Sci. Instrum. vol. 20, 1987, (UK), pp. 568–571.
Säfsten, K.; International—Type Search Report, May 19, 1999; Search Request No. SE 98/00892; pp. 1–4.

*Primary Examiner*—James A. Dudek
*Assistant Examiner*—Andrew Schechter
(74) *Attorney, Agent, or Firm*—Jenkens & Gilchrist, P.C.

(57) ABSTRACT

The present invention discloses an liquid crystal display (LCD) device comprising temperature measuring means. An adhesion material (5), situated either between the top (2) and bottom (3) sheets of the LCD (1) itself or between the LCD and a covering sheet, such as a printed circuit board or a touch screen, having a temperature dependent electrical property, is used as the temperature probe. The electrical property is preferably the electrical conductivity and the adhesion material (5) preferably encircles substantially the active area (4) of the LCD (1). Manufacturing and operational methods for such devices are also disclosed.

57 Claims, 5 Drawing Sheets

LIQUID CRYSTAL DISPLAY TEMPERATURE MEASURING IN ADHESION MATERIAL

TECHNICAL FIELD OF THE INVENTION

The present invention relates to liquid crystal display (LCD) devices in general and in particular to LCD devices comprising temperature measuring means, and to manufacturing and operating methods for such devices.

RELATED ART

There is a growing market for electronic devices of the type having a LCD display for displaying visual information. In many cases the electronic devices also comprises touch screens covering the LCD, by which the user communicates with the device, or other screens connected to the LCD.

Liquid crystals are characterised by their ability to change their optical properties in response to applied electromagnetic fields. This has made them ideal for displaying altering information, such as in liquid crystal displays (LCD). This ability is affected by the temperature of the liquid crystals, which in its turn is dependent on a number of factors, such as air temperature, radiation from the sun, heat generated by electronic equipment in the vicinity of the display etc. The effects of varying LCD temperature is especially pronounced when the optical state of the liquid crystals is determined by low-voltage multiplexing technique, since this puts high requirements on the flexibility of the crystals.

It is therefore desirable to determine as close as possible the actual temperature of the liquid crystals. To obtain as good an estimation as possible of the temperature of the liquid crystals a temperature sensor should be disposed as near the liquid crystals as possible. Numerous patents are concerned with this task.

For example, the abstract of the Japanese patent JP-A-9-160001 describes a LCD control system wherein the contrast of the LCD is controlled by way of measuring the ambient temperature, and adjusting the contrast after comparing the measured temperature to a stored temperature and a contrast setting associated with the stored temperature. A similar system is also described in the abstract of the Japanese patent JP-A-8-114785. Such a control system has the disadvantage that the contrast adjustment is based on an ambient temperature that may differ considerably from temperature of the liquid crystals. This is the case regardless of whether the temperature is measured outside of the equipment in which the LCD is mounted, or inside the housing of the equipment.

It is also known, for example through JP-A 9-258161, to attach a small thermocouple sensor on a LCD display in order to measure its temperature. However, this has the disadvantage that only a point estimation of the LCD temperature is obtained. Therefore, considerable errors could occur, for example in a case where sunlight falls on only a part of the equipment.

Furthermore, through the Japanese patent publication No. 54-064998 it is known to cover a surface of a LCD display with a tin oxide film, and measuring the resistance of the tin oxide film to determine the temperature of the LCD. The tin oxide film may also act as a heating means, to provide a suitable operation temperature to the liquid crystals. If practised in conjunction with a touch screen, this invention has the disadvantage that even a highly transparent additional temperature sensing layer would undesirably reduce the visual contrast of the LCD. Since the touch screen that covers the LCD causes a certain loss of contrast and brilliance in itself, it is generally not desirable to cover the LCD with yet another transparent sheet.

SUMMARY OF THE INVENTION

Common for most of the temperature measuring and compensating LCD systems according to the state of the art is that they include additional means, thermocouples, tin oxide films, sensors, etc. A disadvantage with such solutions is that the areas in which such additional means are located often are very limited and every additional feature causes problems of short circuits or simple space problems, as well as increased mounting costs.

Another problem with solutions according to the state of the art is that most of the sensors are point sensors, which are not able to sense temperature differences over the LCD area.

It is therefore a general object of the present invention to provide a device for measuring the temperature of a LCD, wherein the measurement is performed very near the liquid crystals without introducing additional means. Another object of the present invention is to provide a device for measuring the temperature of a LCD, which gives an weighted temperature estimation over the LCD area. It is also a general object of the present invention to provide a method of manufacturing and a method of operation of such devices.

This and other objects are achieved by the present invention as defined in the accompanying independent claims.

Thus, in a first aspect of the present invention, there is provided an LCD device with an adhesion material, used for adhering the top and bottom sheet of the LCD, which adhesion material has a temperature dependent electric property. In a second aspect of the present invention, there is provided an LCD device with an adhesion material, used for adhering a covering sheet to one side of the LCD, which adhesion material has a temperature dependent electric property. In a third and fourth aspect of the present invention, there are provided portable electronic devices, comprising LCD devices of the above mentioned type. In a fifth aspect of the present invention, there is provided a manufacturing method comprising the step of adhering the top and bottom sheet of the LCD by an adhesion material which has a temperature dependent electric property. In a sixth aspect of the present invention, there is provided a manufacturing method comprising the step of adhering a covering sheet to one side of the LCD by an adhesion material which has a temperature dependent electric property. In a seventh aspect of the present invention there is provided a temperature measuring method comprising the step of measuring a temperature dependent electrical property of an adhesion material in an LCD device. In an eighth aspect of the present invention there is provided an LCD control method comprising the step of measuring a temperature dependent electrical property of an adhesion material in the LCD device.

In preferred embodiments, the covering sheets are printed circuit boards or touch screens. Furthermore, in preferred embodiments, said electronic property is the electric resistivity, and the temperature dependence is monotonic over a user temperature range. In a most preferred embodiment, the adhesion material encircles an area corresponding the liquid crystal operation area.

By the features of the present invention, a high precision estimation of the liquid crystal temperature is achievable. The temperature measurement is furthermore sensitive to temperature gradients. The present invention also has the potential to be cost efficient, since already present means are used for multiple purposes and few new components are added, and the assembling efforts are small.

BRIEF DESCRIPTION OF THE DRAWINGS

Further advantages and possibilities for variations of the present invention are more clearly understood by the following detailed description of embodiments of the present invention, in connection with the attached drawings, in which.

Figure 1:
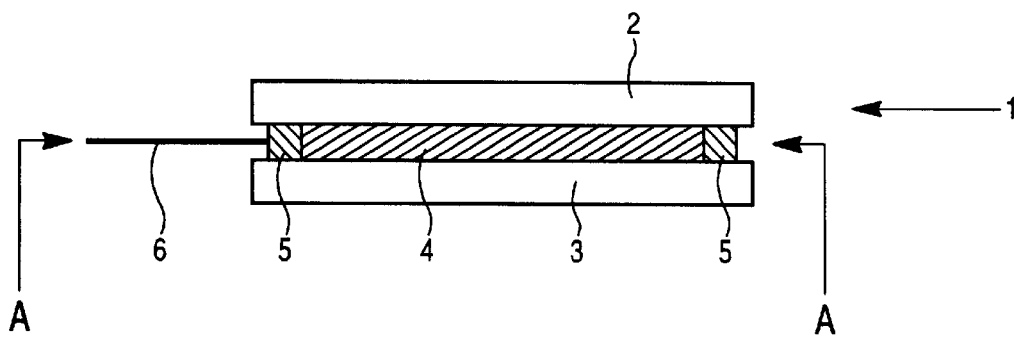
FIG. 1 illustrates an embodiment of an LCD unit according to the present invention.
Figure 2:
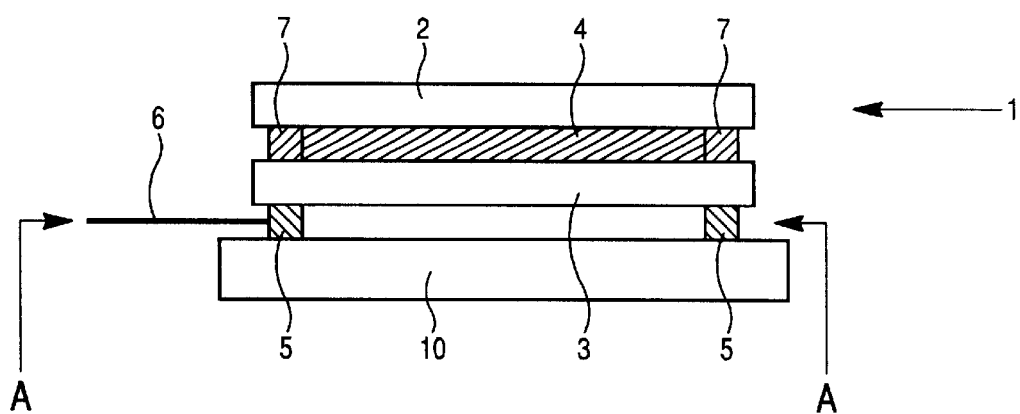
FIG. 2 illustrates an alternative embodiment of an LCD unit according to the present invention.
Figure 3:
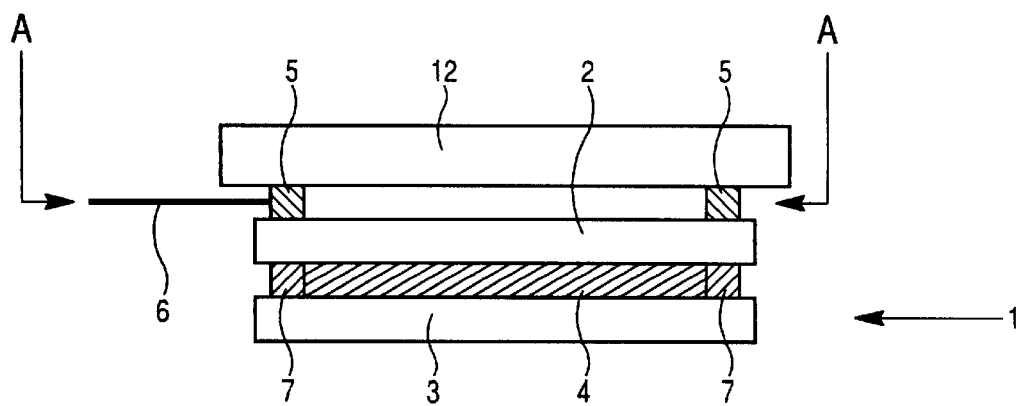
FIG. 3 illustrates another and preferred embodiment of an LCD unit according to the present invention.
Figure 6A:
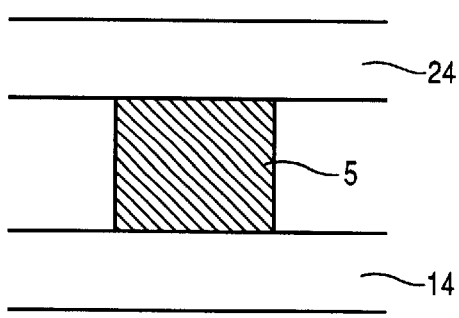
Figure 6B:
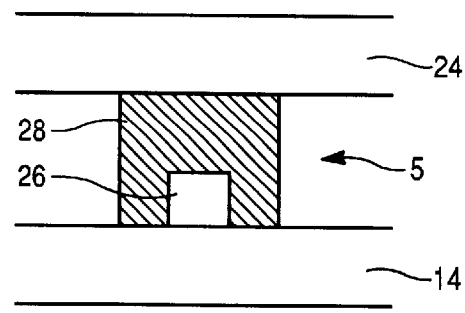
Figure 7:
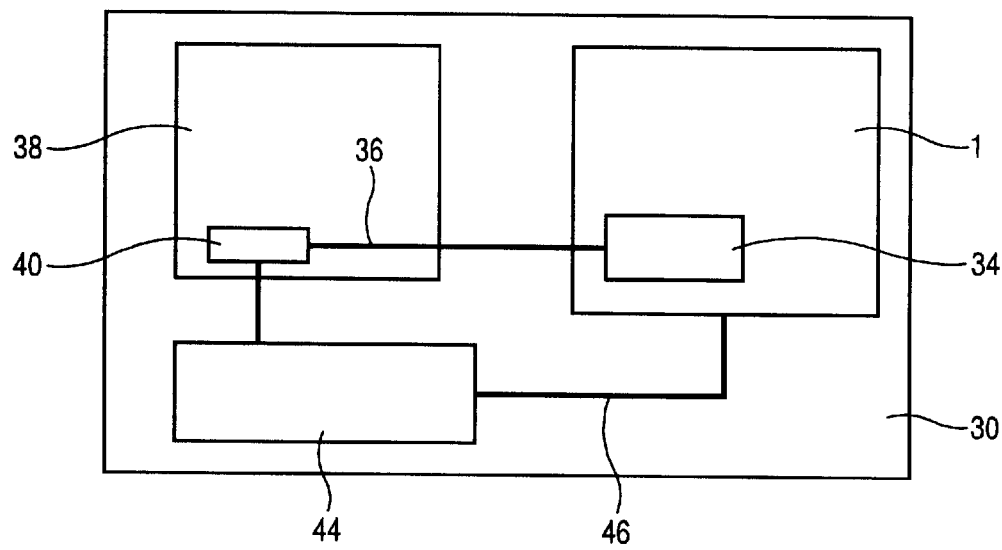
Figure 8:
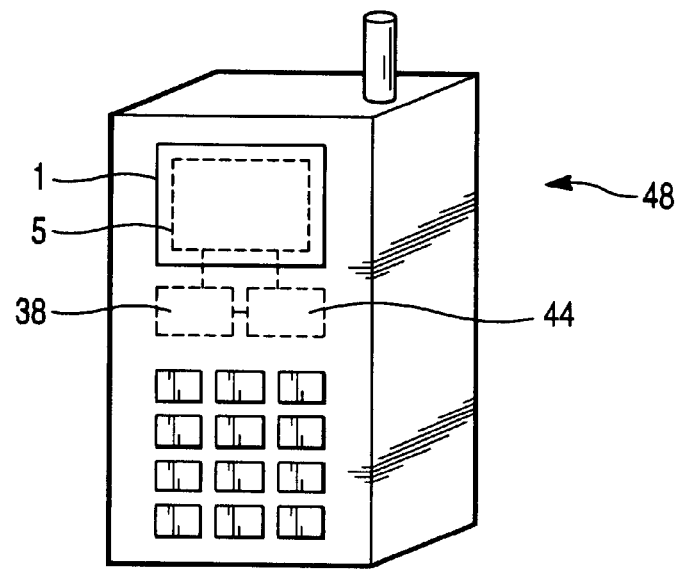
Figure 9:
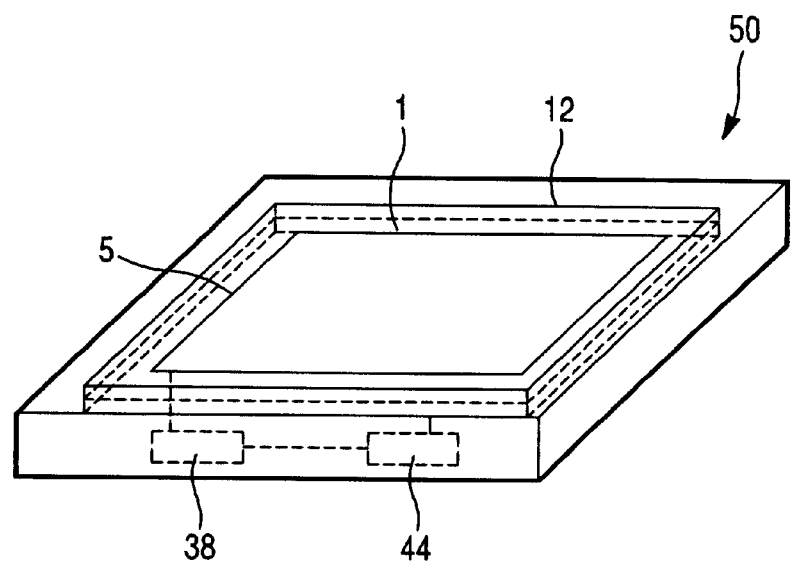
Figure 10:
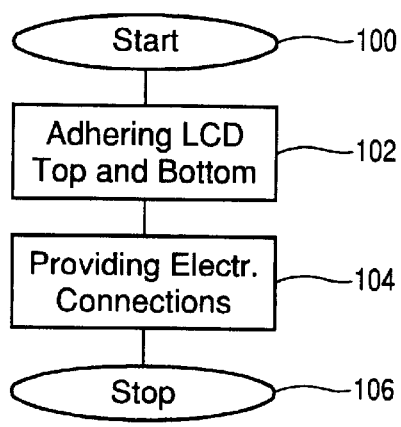
Figure 11:
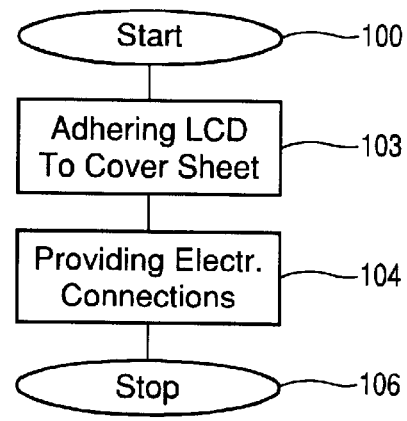
Figure 12:
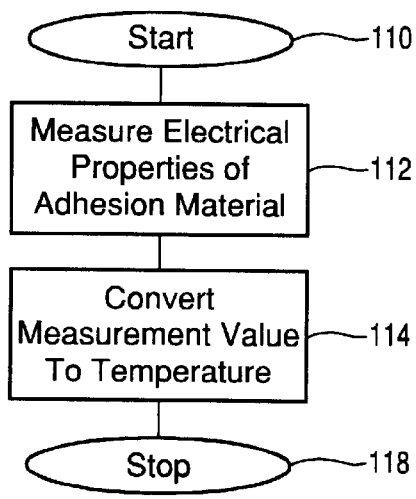
Figure 13:
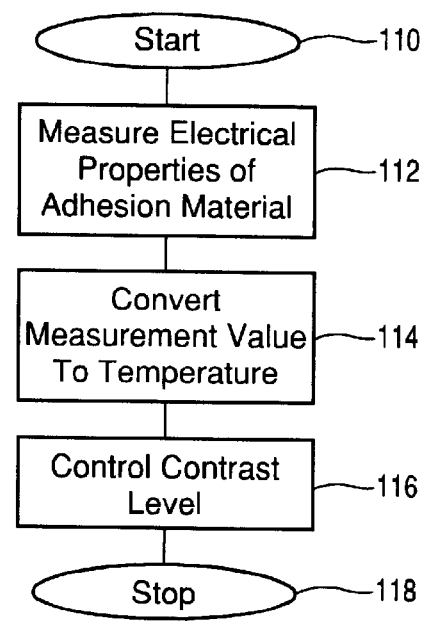

illustrates an alternative embodiment of an adhesion material distribution according to the present invention, taken in a cross sectional view along the line A—A in any of the FIGS. 1 to 3;

FIGS. 6a and 6b; illustrates an adhesion material in a cross sectional view, according to two embodiments of the present invention;

FIG. 7 is a block scheme of an LCD device according to the present invention;

FIG. 8 illustrates a mobile telephone, comprising an LCD device according to the resent invention;

FIG. 9 illustrates a portable computer device, comprising an LCD device with touch screen, according to the present invention;

FIG. 10 is a flow diagram of an embodiment of a manufacturing method according to the present invention;

FIG. 11 is a flow diagram of another embodiment of a manufacturing method according to the present invention;

FIG. 12 is a flow diagram of a temperature measurement method according to the present invention; and FIG. 13 is a flow diagram of an LCD control method according to the present invention.

DETAILED DESCRIPTION OF EMBODIMENTS

Same reference numbers in different figures relates to the corresponding components.

Some embodiments of the invention is now presented. These embodiments should only serve as explanatory examples and should be interpreted in a limiting manner.

FIG. 1 shows a schematic sectional side view of an LCD assembly (1) according to one embodiment of the present invention. The LCD comprises generally a top sheet 2 and a bottom sheet 3, between which liquid crystals 4 are disposed. The top sheet 2 and the bottom sheet 3 are normally made of transparent glass. The top sheet 2 and the bottom sheet 3 are fixed together, enclosing the liquid crystals 4 in a liquid crystal volume, by fastening means. In a conventional LCD unit, this fastening means may be mechanical means, such as distance elements combined with screws and nuts, or adhesive material optionally combined with distance elements. In this embodiment of the present invention, the fastening means comprises an adhesion material 5, at least a part of which has a temperature dependent electric property. Connections 6, of which only one is shown, are provided in such a contact with the adhesion material 5, that the electric property can be measured.

An LCD unit is often assembled together with other covering sheets. A printed circuit board (PCB) is normally attached, and it is also very common to attach a touch screen above the top sheet of an LCD. Such arrangements opens for alternative embodiments.

A schematic sectional side view of an LCD assembly according to another embodiment of the present invention is shown in FIG. 2. Here, a LCD 1 generally comprises a top sheet 2 and a bottom sheet 3, between which liquid crystals 4 are disposed. The top sheet 2 and the bottom sheet 3 are normally made of transparent glass. The top sheet 2 and the bottom sheet 3 are fixed together, enclosing the liquid crystals 4 in a liquid crystal volume, by fastening means 7. This fastening means may be mechanical means, such as distance elements combined with screws and nuts, or adhesive material optionally combined with distance elements. The LCD 1 is attached on top of a printed circuit board (PCB) 10, by means of attachment means. In conventional LCD devices, this attachment means may be mechanical means or adhesive materials. In this embodiment of the present invention, the attachment means comprises an adhesion material 5, at least a part of which has a temperature dependent electric property. Connections 6, of which only one is shown, are provided in such a contact with the adhesion material 5, that the electric property can be measured.

A schematic sectional side view of an LCD assembly according to an alternative embodiment of the present invention is shown in FIG. 3. Here, a LCD 1 generally comprises a top sheet 2 and a bottom sheet 3, between which liquid crystals 4 are disposed. The top sheet 2 and the bottom sheet 3 are normally made of transparent glass. The top sheet 2 and the bottom sheet 3 are fixed together, enclosing the liquid crystals 4 in a liquid crystal volume, by fastening means 7. This fastening means may be mechanical means, such as distance elements combined with screws and nuts, or adhesive material optionally combined with distance elements. A touch screen 12 is attached on top of the LCD 1, by means of attachment means. In conventional LCD devices, this attachment means may be mechanical means or adhesive materials. In this embodiment of the present invention, the attachment means comprises an adhesion material 5, at least a part of which has a temperature dependent electric property. Connections 6, of which only one is shown, are provided in such a contact with the adhesion material 5, that the electric property can be measured.

With reference to FIGS. 1–3, the adhesion material 5 is a material with a double function. First, the adhesion material 5 is responsible for connecting solid sheets of the LCD assembly, such as LCD top sheet, LCD bottom sheet, touch screen or PCB. This function is the sole function of an adhesion material according to the state of the art. The adhesion material 5 according to the present invention, however, also has a second function, a temperature sensing function. The adhesion material 5 possesses an electric property, which changes its magnitude with temperature. This means that measuring this electric property, the temperature of the adhesion material 5 can be detectable. The adhesion material 5 is in direct contact with at least one of the sheets 2, 3, enclosing the liquid crystals 4, which sheets normally have a very good heat conductivity. This implies that the temperature, experienced by the adhesion material 5, is very likely to be very close to the actual temperature of the liquid crystals 4. Thus, measuring the temperature of the adhesion material 5 gives a reasonable estimation of the temperature of the liquid crystals 4. Such a temperature will be a weighted temperature of the different parts of the adhesion material 5, where the weighting function depends on the type of electrical property and the geometric distribution of the adhesion material 5 relative the connections 6.

Preferably, the adhesion material 5 is conducting, presenting a temperature dependent electrical resistivity. By electrically connecting the connections 6 to the adhesion material 5 the resistance of the adhesion material 5 is measurable, and from such a resistance value, a temperature may be determined. Alternatively, the temperature dependent electrical property of the adhesion material 5 can be e.g. dielectric values, capacitance or inductance. In such alternatives, the connections may be arranged to the adhesion material 5 in a suitable manner for measuring dielectric values, capacitance and inductance, respectively.

The most straight-forward choice is, however, to use a temperature dependent resistivity. Materials performing such temperature dependent resistivities may be produced by using conducting polymers, polymers comprising fine powders of conducting materials or the like. Fine silver particles are e.g. easily mixed with different kinds of adhesive materials. If the total content of metal particles becomes high, the overall conductivity becomes dependent on the metal particle conductivity, which is temperature dependent. Any differences in thermal expansion for the metal particles and the adhesive itself may also lead to measurable conductivity changes. Another possible choice of material would be indium-tin-oxide, which is shown to present a temperature dependent resistance and which is commercially available. Such materials have been used in solutions where the whole surface is covered by a transparent material. The indium-tin-oxide is, however, not a perfect choice as adhesive material, but modifications improving the adhesivity are possible to use, also if it leads to a decreased transparency, since that property is of no importance in this case. The indium-tin-oxide could also be provided as a film, provided with additional adhesive material on both surfaces. There are also various tapes available today, e.g. through 3M, which are adhesive and conducting, and which presents temperature dependencies which are large enough to be used as a temperature indicator.

From a relationship between electrical resistance and temperature for the selected adhesion material 5, a correlation between resistance and temperature can be made. Preferably, the relationship should be a monotonic function of temperature, at least around the expected operation temperatures for the LCD. A resistance value should be associated with a certain temperature, or at least indicate a temperature range. For a given material, the relationship could be available from the manufacturer of the adhesion material. Otherwise it is easily established by simply measuring the electrical resistance of a sample of the material at a selected set of temperatures within the operation temperature range of the LCD. Typically, the ambient temperature specified for the equipment that includes the LCD could be used as an approximation of the operating temperature.

Figure 4:
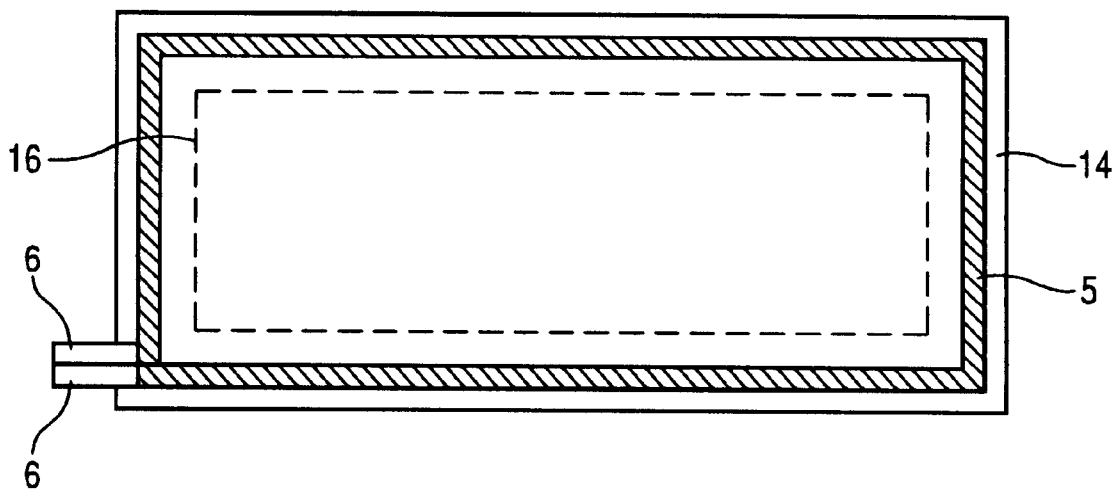
FIG.4 illustrates a preferred embodiment of an adhesion material distribution according to the present invention, taken in a cross sectional view along the line A—A in any of the FIGS. 1 to 3.

The geometrical distribution of the adhesion material 5 is also important. FIG. 4 illustrates a top sectional view of any of the devices shown in FIGS. 1–3 along the line A—A. An LCD top or bottom sheet 14, depending on the actual configuration creates the outer limit of the adhesion material 5 distribution. The LCD has an active area, within which the liquid crystals are situated. This active area 16 is represented by a dotted line in FIG. 4. The adhesion material 5 is in this embodiment applied in a stripe surrounding or encircling the active area 16. Two connections 6 are connected to each end of the adhesion material 5 stripe. The adhesion material 5 distribution of this embodiment has the advantage that the temperature experienced by the adhesion material 5 is more likely to resemble the temperature distribution of the LCD active area 16 if a temperature gradient is present. The measured electrical property will be a weighted mean value of the electrical property at each point along the stripe.

Figure 5:
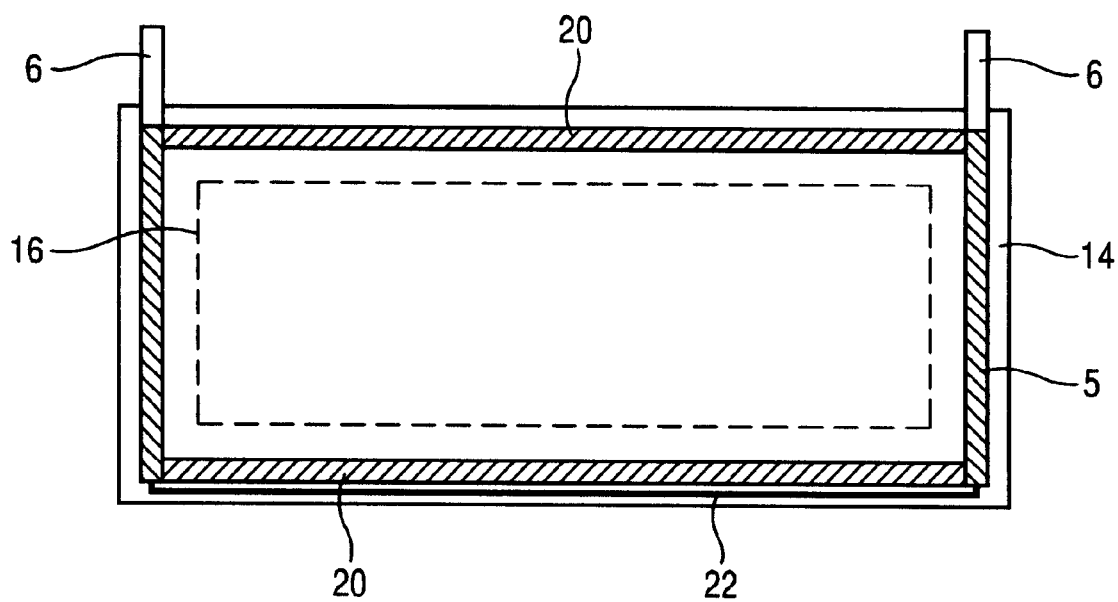

In cases, where the adhesion material 5 is expensive and it is not economically acceptable to use it substantially encircling the whole active area 16, an embodiment such as shown in FIG. 5 could be useful. In this embodiment. The adhesion material 5 with the temperature dependent electrical property is only supplied at selected positions or sections around the active area 16. Between these adhesion material 5 sections, sections with other adhesives 20 are provided, completing the adhering function for the assembly. To close the electric circuitry of adhesion material 5 with resistance temperature dependency, interconnections 22 may have to be supplied. This embodiment reduces the use of an expensive adhesion material 5 but has still most of the advantages of the present invention.

A preferred way to apply the adhesion material 5 is shown in FIG. 6a. An LCD top or bottom sheet 14 is adhered to a LCD sheet, PCB sheet or touch screen 24, depending on the actual configuration. The adhesion material 5 is here applied in one homogenous stripe. FIG. 6b shows an alternative embodiment of the adhesion material 5. In this case, the adhesion material 5 is divided into two fractions, a first fraction 26 having both the adhesive property and the temperature dependent property, and a second fraction 28 having only an adhesive function. This embodiment is preferable, if the adhesion properties of the first fraction 26 has deteriorated so much due to the provision of the special electric property, that the adhering can not be considered as satisfactory. The second fraction can thus be selected to optimise the adhesive properties. This design of the adhesion material 5 is also preferably in cases where a direct electrical contact with a LCD sheet, PCB board, touch screen or liquid crystals has to be avoided. The first fraction 26 gives the temperature sensing properties, and the second fraction 28 isolates the first fraction electrically from the surroundings. It is obvious for anyone skilled in the art that the geometrical distribution of the fractions 26 and 28 may vary.

In order to illustrate the use of the temperature sensing element according to the present invention, e.g. to adjust the contrast of an LCD, FIG. 7 shows a schematic block diagram of an arrangement for adjustment of an LCD. A sensor element 34, according to the present invention in the form of an adhesion material, is arranged in connection with an LCD unit 1. The sensor element 34 provides a measurement signal, e.g. in the form of a voltage signal over a connection 36 to a thermometer device 38. A converter 40 in the thermometer 38 receives the measurement signal and converts this signal, according to the predetermined temperature behaviour of the adhesion material, to a temperature signal, associated with a temperature of the LCD. The temperature signal is transferred to a control means 44, e.g. a preprogrammed microprocessor, which preferably is the main control means for the LCD assembly. This unit 44 responds to the measured temperature in the form of the temperature signal from the thermometer 38 by providing a LCD control voltage signal by a connection 46 to the LCD 1. However, the contrast adjustment of an LCD is in itself conventional and well known to those skilled in the art, and no further explanation is given on this matter in the present description.

The present invention is particularly useful for LCD's that are used for displaying visual information in mobile electronic units, such as mobile telephones, hand held computers etc. FIG. 8 schematically illustrates a mobile telephone 48 comprising an LCD 1 screen. The adhesion material 5 between the top and bottom sheets of the LCD 1 constitutes the temperature probe according to the present invention. A thermometer 38 is connected to the adhesive material 5, reading a signal associated with a temperature of the LCD 1. A control unit 44 controls the voltages to the LCD as a response of this signal. A mobile telephone according to FIG. 8 has the advantage that the user is presented with an LCD that always shows information in good light contrast, regardless of the ambient temperature as well as the internal temperature of the mobile telephone.

FIG. 9 schematically illustrates a hand held computer 50. The computer 50 comprises an LCD screen 1, covered with a touch screen 12. The touch screen 12 is used for controlling the computer actions. The adhesion material 5 between the touch screen and the LCD 1 is according to the present invention sensing a temperature dependent value associated with the LCD 1. A signal representing this measurement value is sent to a thermometer 38, which converts the signal to a temperature signal. A control unit 44 controls the voltages of the LCD 1 according to this temperature signal. A computer according to FIG. 9 has the advantage that the user is presented with an LCD that always shows information in good light contrast, regardless of the ambient temperature as well as the internal temperature of the computer.

As someone skilled in the art recognises, the thermometer and control unit may also be implemented in one physical unit, e.g. by a microprocessor.

FIG. 10 shows a flow chart of an embodiment of a method for producing an LCD device according to the present invention. The method starts in step 100. In step 102 parts of the top and bottom sheets of an LCD, preferably encircling the active areas, are covered with adhesion material, having a temperature dependent electrical property, and brought together. The adhesion material may in some cases be hardened to perform its fastening function. In step 104, the adhesion material is in a suitable manner, depending on the type of electrical property, connected to the adhesion material. The method is ended at 106.

FIG. 11 shows a flow chart of an alternative embodiment of a method for producing an LCD device according to the present invention. The method starts in step 100. In step 103 parts of the top or bottom sheets of an LCD and a covering sheet, preferably encircling the active areas, are covered with adhesion material, having a temperature dependent electrical property, and brought together. The covering sheet may e.g. be a PCB or a touch screen. The adhesion material may in some cases be hardened to perform its fastening function. In step 104, the adhesion material is in a suitable manner, depending on the type of electrical property, connected to the adhesion material. The method is ended at 106.

FIG. 12 shows a flow chart of an embodiment of a temperature measuring method using an LCD device according to the present invention. The method starts in step 110. In step 112 electrical properties of an adhesion material in the LCD device is measured. The measured value is in step 114 correlated to a temperature according to a predetermined relation between the electrical property and ambient temperature. The method is ended at 118.

FIG. 13 shows a flow chart of an embodiment of an LCD temperature control method according to the present invention. The method starts in step 110. In step 112 electrical properties of an adhesion material in the LCD device is measured. The measured value is in step 114 correlated to a temperature according to a predetermined relation between the electrical property and ambient temperature. In step 116, the determined temperature is used for controlling voltages to the LCD for adjusting the contrast to a required level. The method is ended at 118.

The advantages with the present invention is easily understandable. As the adhesion material is in thermal contact with the LCD surface, and as the LCD glass sheet has excellent heat conductivity, the temperature of the adhesion material represents a good estimation of the temperature of the liquid crystals of the LCD. Furthermore, as the adhesion material in a preferred embodiment encircles substantially the entire active LCD area, the measured electrical property of the adhesion material represents an overall estimation which, in cases of uneven temperature distribution, is an integral measure of both warmer and cooler areas on the LCD.

In general, the components necessary to carry out the invention are already present in an LCD assembly. Any additional components are of low cost and are easy to assemble, thereby providing for cost efficient production. Apart from being cost efficient, the invention makes it unnecessary to provide any additional temperature sensing means in addition to the adhesion material, thereby avoiding occupying an undesired amount of space close to the LCD.

It should be understood that the scope of the present invention is not limited to the examples of embodiments described above, but is defined by the scope of the appended patent claims.

What is claimed is:

1. A liquid crystal display (LCD) device comprising a top sheet, a bottom sheet adhered to said top sheet by adhesion material, liquid crystals disposed between said top sheet and said bottom sheet, and means for temperature sensing, said means for temperature sensing including at least a part of said adhesion material, having a temperature dependent electrical property.

2. The liquid crystal display (LCD) device according to claim 1, wherein said electrical property is electrical resistivity.

3. The liquid crystal display (LCD) device according to claim 1, wherein said electrical property has a monotonic temperature dependence over a temperature range in which said LCD is used.

4. The liquid crystal display (LCD) device according to claim 1, wherein said part of said adhesion material having said temperature dependent electrical property substantially encircles said liquid crystals.

5. The liquid crystal display (LCD) device according to claim 1, further comprising connectors connected to said part of said adhesion material having said temperature dependent in such a manner that said electrical property is measurable by said connectors.

6. The liquid crystal display (LCD) device according to claim 5, further comprising a thermometer for measuring a temperature in the vicinity of said LCD, said thermometer comprises measuring means connected to said connectors for measuring of said electrical property.

7. The liquid crystal display (LCD) device according to claim 6, wherein said thermometer comprises a converter for converting a measured value of said electrical property to said temperature.

8. The liquid crystal display (LCD) device according to claim 6 or 7, further comprising control means for compensating the operation of said LCD based on said temperature.

9. A liquid crystal display (LCD) device, comprising a liquid crystal display (LCD) in turn comprising a volume of liquid crystals, and a covering sheet adhered to said LCD by adhesion material and means for temperature sensing, said means for temperature sensing includes at least a part of said adhesion material, having a temperature dependent electrical property.

10. The liquid crystal display (LCD) device according to claim 9, wherein said covering sheet is a printed circuit board (PCB).

11. The liquid crystal display (LCD) device according to claim 9, wherein said covering sheet is a touch screen.

12. The liquid crystal display (LCD) device according to claim 9, wherein said electrical property is electrical resistivity.

13. The liquid crystal display (LCD) device according to claim 9, wherein said electrical property has a monotonic temperature dependence over a temperature range in which said LCD is used.

14. The liquid crystal display (LCD) device according to claim 9, wherein said part of said adhesion material having said temperature dependent electrical property substantially encircles said liquid crystals.

15. The liquid crystal display (LCD) device according to claim 9, further comprising connectors connected to said part of said adhesion material having said temperature dependent in such a manner that said electrical property is measurable by said connectors.

16. The liquid crystal display (LCD) device according to claim 15, further comprising a thermometer for measuring a temperature in the vicinity of said LCD, said thermometer comprises measuring means connected to said connectors for measuring of said electrical property.

17. The liquid crystal display (LCD) device according to claim 16, wherein said thermometer comprises a converter for converting a measured value of said electrical property to said temperature.

18. The liquid crystal display (LCD) device according to claim 16 or 17, further comprising control means for compensating the operation of said LCD based on said temperature.

19. A portable electronic device, comprising a liquid crystal display (LCD), which in turn comprises a top sheet, a bottom sheet adhered to said top sheet by adhesion material, liquid crystals disposed between said top sheet and said bottom sheet, and means for temperature sensing, said means for temperature sensing includes at least a part of said adhesion material, having a temperature dependent electrical property.

20. The portable electronic device according to claim 19, wherein said electrical property is electrical resistivity.

21. The portable electronic device according to claim 19, wherein said electrical property has a monotonic temperature dependence over a temperature range in which said LCD is used.

22. The portable electronic device according to claim 19, wherein said part of said adhesion material having said temperature dependent electrical property substantially encircles said liquid crystals.

23. The portable electronic device according to claim 19, further comprising connectors connected to said part of said adhesion material having said temperature dependent in such a manner that said electrical property is measurable by said connectors.

24. The portable electronic device according to claim 23, further comprising a thermometer for measuring a temperature in the vicinity of said LCD, said thermometer comprises measuring means connected to said connectors for measuring of said electrical property.

25. The portable electronic device according to claim 24, wherein said thermometer comprises a converter for converting a measured value of said electrical property to said temperature.

26. The portable electronic device according to claim 24 or 25, further comprising control means for compensating the operation of said LCD based on said temperature.

27. A portable electronic device, comprising a liquid crystal display (LCD), which in turn comprises a volume of liquid crystals, and a covering sheet adhered to said LCD by adhesion material, and means for temperature sensing, said means for temperature sensing includes at least a part of said adhesion material, having a temperature dependent electrical property.

28. The portable electronic device according to claim 27, wherein said covering sheet is a printed circuit board (PCB).

29. The portable electronic device according to claim 27, wherein said covering sheet is a touch screen.

30. The portable electronic device according to claim 27, wherein said electrical property is electrical resistivity.

31. The portable electronic device according to claim 27, wherein said electrical property has a monotonic temperature dependence over a temperature range in which said LCD is used.

32. The portable electronic device according to claim 27, wherein said part of said adhesion material having said temperature dependent electrical property substantially encircles said liquid crystals.

33. The portable electronic device according to claim 27, further comprising connectors connected to said part of said adhesion material having said temperature dependent in such a manner that said electrical property is measurable by said connectors.

34. The portable electronic device according to claim 33, further comprising a thermometer for measuring a temperature in the vicinity of said LCD, said thermometer comprises measuring means connected to said connectors for measuring of said electrical property.

35. The portable electronic device according to claim 34, wherein said thermometer comprises a converter for converting a measured value of said electrical property to said temperature.

36. The portable electronic device according to claim 34 or 35, further comprising control means for compensating the operation of said LCD based on said temperature.

37. A method for manufacturing of a liquid crystal display (LCD) comprising the step of connecting a top sheet and a bottom sheet to enclose liquid crystals, said connecting step comprises adhesion of said top sheet to said bottom sheet by adhesion material, whereby at least a part of said adhesion material, having a temperature dependent electrical property, is arranged included in a temperature sensing means.

38. The method for manufacturing according to claim 37, further comprising the step of providing electrical connections to said part of said adhesion material.

39. The method for manufacturing according to claim 38, further comprising the step of connecting said connections to a thermometer.

40. A method for manufacturing of a liquid crystal display (LCD) unit comprising the step of connecting a liquid crystal display (LCD) to a covering sheet, said connecting step comprises adhesion of LCD to said covering sheet by adhesion material whereby at least a part of said adhesion material, having a temperature dependent electrical property, is arranged included in a temperature sensing means.

41. The method for manufacturing according to claim 40, wherein said covering sheet is a printed circuit board (PCB).

42. The method for manufacturing according to claim 40, wherein said covering sheet is a touch screen.

43. The method for manufacturing according to claim 40, further comprising the step of providing electrical connections to said part of said adhesion material.

44. A method for manufacturing according to claim 43, further comprising the step of connecting said connections to a thermometer.

45. A temperature measurement method for a liquid crystal display (LCD) unit, comprising the steps of:

measuring a value of a temperature dependent electrical property of at least a part of an adhesion layer in said LCD unit; and correlating said measured value to a temperature associated with said LCD unit.

46. The temperature measurement method according to claim 45, wherein said adhesion layer is situated between a top sheet and a bottom sheet of a liquid crystal display in said LCD unit.

47. The temperature measurement method according to claim 45, wherein said adhesion layer is situated between a liquid crystal display and a covering sheet in said LCD unit.

48. The temperature measurement method according to claim 47, wherein said covering sheet is a printed circuit board (PCB).

49. The temperature measurement method according to claim 47, wherein said covering sheet is a touch screen.

50. The temperature measurement method according to any of the claims 45 to 49, wherein said measuring step comprises measuring of the electric resistance of said part of said LCD unit.

51. A control method for controlling a liquid crystal display (LCD) unit, comprising the steps of:

measuring a value of a temperature dependent electrical property of at least a part of an adhesion layer in said LCD unit;

correlating said measured value to a temperature associated with said LCD unit, and controlling operation conditions for said LCD unit in response to said temperature.

52. The control method according to claim 51, wherein said adhesion layer is situated between a top sheet and a bottom sheet of a liquid crystal display in said LCD unit.

53. The control method according to claim 51, wherein said adhesion layer is situated between a liquid crystal display and a covering sheet in said LCD unit.

54. The control method according to claim 53, wherein said covering sheet is a printed circuit board (PCB).

55. The control method according to claim 53, wherein said covering sheet is a touch screen.

56. The control method according to claim 51, wherein said controlling step comprises the step of adjusting the contrast level of said LCD in response said temperature.

57. The control method according to any of the claims 51 to 56, wherein said measuring step comprises measuring of the electric resistance of said part of said LCD unit.

* * * * *

UNITED STATES PATENT AND TRADEMARK OFFICE
CERTIFICATE OF CORRECTION

PATENT NO. : 6,285,421 B1  
DATED : September 4, 2001  
INVENTOR(S) : Lutnaes

Page 1 of 1

It is certified that error appears in the above-identified patent and that said Letters Patent is hereby corrected as shown below:

<u>Column 3,</u>  
Line 26, replace "6b; illustrates" with -- 6b illustrates --  
Line 32, replace "recent" with -- present --

<u>Column 10,</u>  
Line 64, replace "material whereby" with -- material, whereby --

Signed and Sealed this

Thirtieth Day of April, 2002

Attest:

JAMES E. ROGAN  
Attesting Officer     Director of the United States Patent and Trademark Office